United States Patent
Wang et al.

(10) Patent No.: US 10,904,447 B2
(45) Date of Patent: Jan. 26, 2021

(54) METERING COMPENSATION METHOD AND RELATED MONITORING CAMERA APPARATUS

(71) Applicant: VIVOTEK INC., New Taipei (TW)

(72) Inventors: Hsiang-Sheng Wang, New Taipei (TW); Shih-Hsuan Chen, New Taipei (TW)

(73) Assignee: VIVOTEK INC., New Taipei (TW)

(*) Notice: Subject to any disclaimer, the term of this patent is extended or adjusted under 35 U.S.C. 154(b) by 0 days.

(21) Appl. No.: 16/669,533

(22) Filed: Oct. 31, 2019

(65) Prior Publication Data
US 2020/0195827 A1 Jun. 18, 2020

(30) Foreign Application Priority Data
Dec. 12, 2018 (TW) .............................. 107144858 A (51) Int. Cl.
*H04N 5/235* (2006.01)
*H04N 7/18* (2006.01)
*G06T 5/40* (2006.01)

(52) U.S. Cl.
CPC ............. *H04N 5/2353* (2013.01); *G06T 5/40* (2013.01); *H04N 7/18* (2013.01)

(58) Field of Classification Search
CPC ........... H04N 7/18; H04N 5/2353; G06T 5/40
See application file for complete search history.

(56) References Cited

U.S. PATENT DOCUMENTS

| | | | |
|---|---|---|---|
| 4,729,016 A * | 3/1988 | Alkofer | H04N 1/60 355/38 |
| 2006/0274180 A1* | 12/2006 | Yasuda | H04N 5/23293 348/333.01 |
| 2007/0009253 A1* | 1/2007 | Nikkanen | G03B 7/097 396/234 |
| 2007/0263097 A1* | 11/2007 | Zhao | H04N 5/2351 348/221.1 |
| 2009/0027545 A1* | 1/2009 | Yeo | H04N 5/355 348/362 |
| 2009/0161953 A1* | 6/2009 | Ciurea | H04N 1/4074 382/172 |
| 2011/0254976 A1* | 10/2011 | Garten | G06F 3/1454 348/229.1 |
| 2012/0105672 A1* | 5/2012 | Doepke | H04N 5/2351 348/229.1 |

(Continued)

*Primary Examiner* — Jamie J Atala
*Assistant Examiner* — Michael Robert Cammarata
(74) *Attorney, Agent, or Firm* — Winston Hsu (57) ABSTRACT

A metering compensation method for effectively increasing visibility of an image is applied to a monitoring camera apparatus. The metering compensation method includes acquiring a histogram of the image, setting a convergent target value and a minimal mapping value, utilizing the convergent target value and the minimal mapping value to set a weighting function, transforming the histogram into a weighted histogram via the weighting function for acquiring an intensity mean of the weighted histogram, and utilizing the convergent target value and the intensity mean to generate a first exposure compensation value. The first exposure compensation value can be used for determining whether to adjust an exposure parameter of the monitoring camera apparatus.

18 Claims, 8 Drawing Sheets

(56) References Cited

U.S. PATENT DOCUMENTS

| | | | |
|---|---|---|---|
| 2013/0202206 A1* | 8/2013 | Yi ........................ | G06K 9/4642 |
| | | | 382/170 |
| 2014/0198218 A1* | 7/2014 | Afrooze .................... | G06T 5/40 |
| | | | 348/164 |
| 2015/0022687 A1* | 1/2015 | Galor ................. | H04N 5/23229 |
| | | | 348/229.1 |

* cited by examiner

METERING COMPENSATION METHOD AND RELATED MONITORING CAMERA APPARATUS

BACKGROUND OF THE INVENTION

1. Field of the Invention

The present invention relates to an algorithm for exposure adjustment, and more particularly, to a metering compensation method and a related monitoring camera apparatus of increasing visibility of an image.

2. Description of the Prior Art

A conventional image exposure adjusting method has some steps of generating a histogram of an image from the camera apparatus, and dividing the histogram into several regions according to a grey level of each pixel. A region with pixels in the high grey level is a bright region of the image, and a region with pixels in the low grey level is a dark region of the image. When intensity of the image is decreased, the conventional image exposure adjusting method computes a trend of the dark region in the histogram to increase the intensity of the image by adjusting an exposure parameter (which means the whole histogram is shifted in a direction toward the high-grey-level place), and vice versa. The conventional image exposure adjusting method does not consider distribution of the whole histogram; one side of the histogram may have better visibility, but the visibility of the all image is spoiled. The conventional image exposure adjusting method may overcome one over-bright or over-dark problem of the image, but some regions with normal intensity distribution is affected and results in low visibility, so that the image has a large blurred region. If the conventional image exposure adjusting method is applied for a monitoring camera, the monitoring image cannot display clear facial features of the unauthorized person inside the monitoring area, Thus, design of an exposure adjusting method capable of preventing the image from over-exposure and further preserving details of the dark region in the image is an important issue in the monitoring apparatus industry.

SUMMARY OF THE INVENTION

The present invention provides a metering compensation method and a related monitoring camera apparatus of increasing visibility of an image for solving above drawbacks.

According to the claimed invention, a metering compensation method is applied to a monitoring camera apparatus of increasing visibility of an image. The metering compensation method includes acquiring a histogram of the image generated by the monitoring camera apparatus, setting a convergent target value and a minimal mapping value, utilizing the convergent target value and the minimal mapping value to set a weighting function, transforming the histogram into a weighted histogram via the weighting function to acquire an intensity mean of the weighted histogram, and utilizing the convergent target value and the intensity mean to generate a first exposure compensation value. Adjustment of an exposure parameter of the monitoring camera apparatus is determined by the first exposure compensation value According to the claimed invention, a monitoring camera apparatus of increasing visibility of an image includes an image receiver and an operation processor. The image receiver is adapted to generate the image. The operation processor is electrically connected to the image receiver. The operation processor is adapted to acquire a histogram of the image generated by the monitoring camera apparatus, set a convergent target value and a minimal mapping value, utilize the convergent target value and the minimal mapping value to set a weighting function, transform the histogram into a weighted histogram via the weighting function to acquire an intensity mean of the weighted histogram, and utilize the convergent target value and the intensity mean to generate a first exposure compensation value for acquiring the high quality image in a low dynamic place or in a high dynamic place. Adjustment of an exposure parameter of the monitoring camera apparatus is determined by the first exposure compensation value.

The present invention provides the metering compensation method containing the weighted distribution metering function and the high-intensity compensation metering function. The weighted distribution metering function can generate the weighting function in accordance with the convergent target value and the minimal mapping value, and acquire the intensity mean of the histogram transformed by the weighting function, and compute the first exposure compensation value via the intensity ratio of the convergent target value to the intensity mean, so as to effectively preserve the image details according to distribution in the histogram. The high-intensity compensation metering function can set the plurality of sub-bright regions inside the bright region of the histogram; each the sub-bright region can be weighted by specific weighting parameter to compute the intensity average, and a difference between the intensity average and the convergent target value can represent an amendable range of the bright region for acquiring the second exposure compensation value. The monitoring camera apparatus of the present invention can adjust the exposure parameter of the adjustment module in accordance with the sum of the first exposure compensation value and the second exposure compensation value. The present invention can prevent the image from over-exposure and preserve details of the dark region for acquiring the monitoring image with the preferred visibility.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
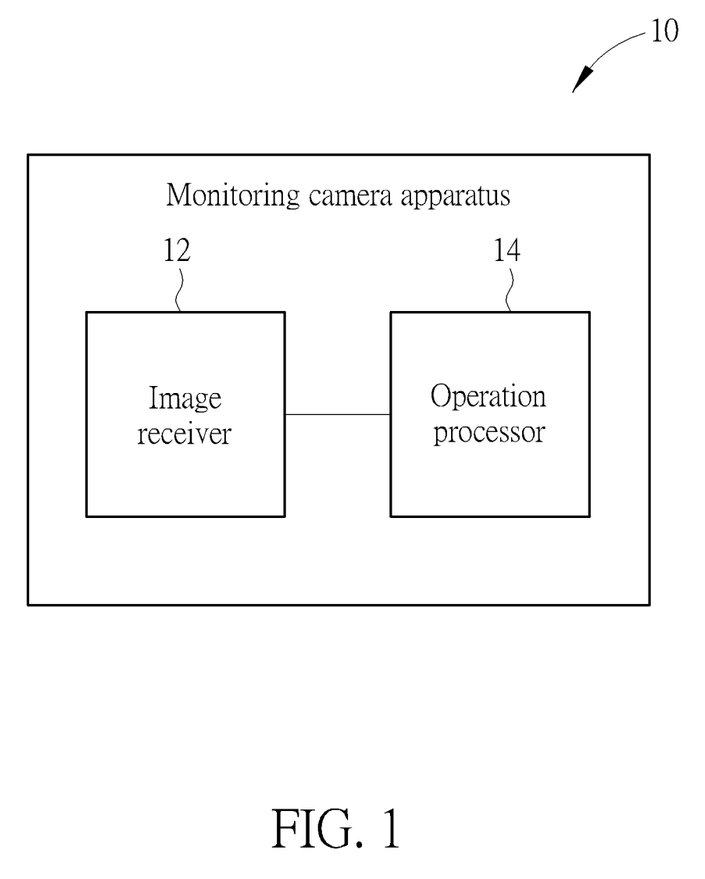
FIG. 1 is a functional block diagram of a monitoring camera apparatus according to an embodiment of the present invention.
Figure 2:
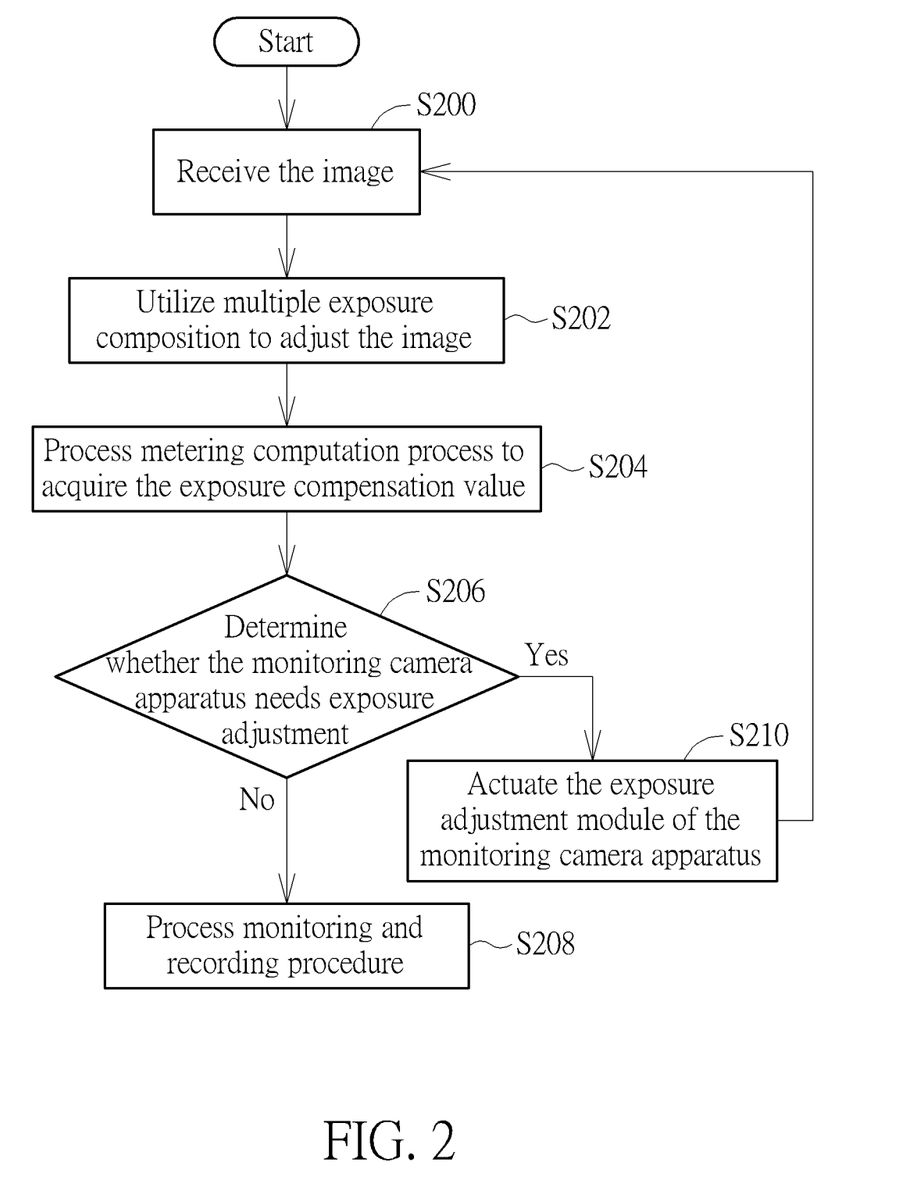
FIG. 2 is a flow chart of exposure computation of the monitoring camera apparatus according to an embodiment of the present invention.
Figure 3:
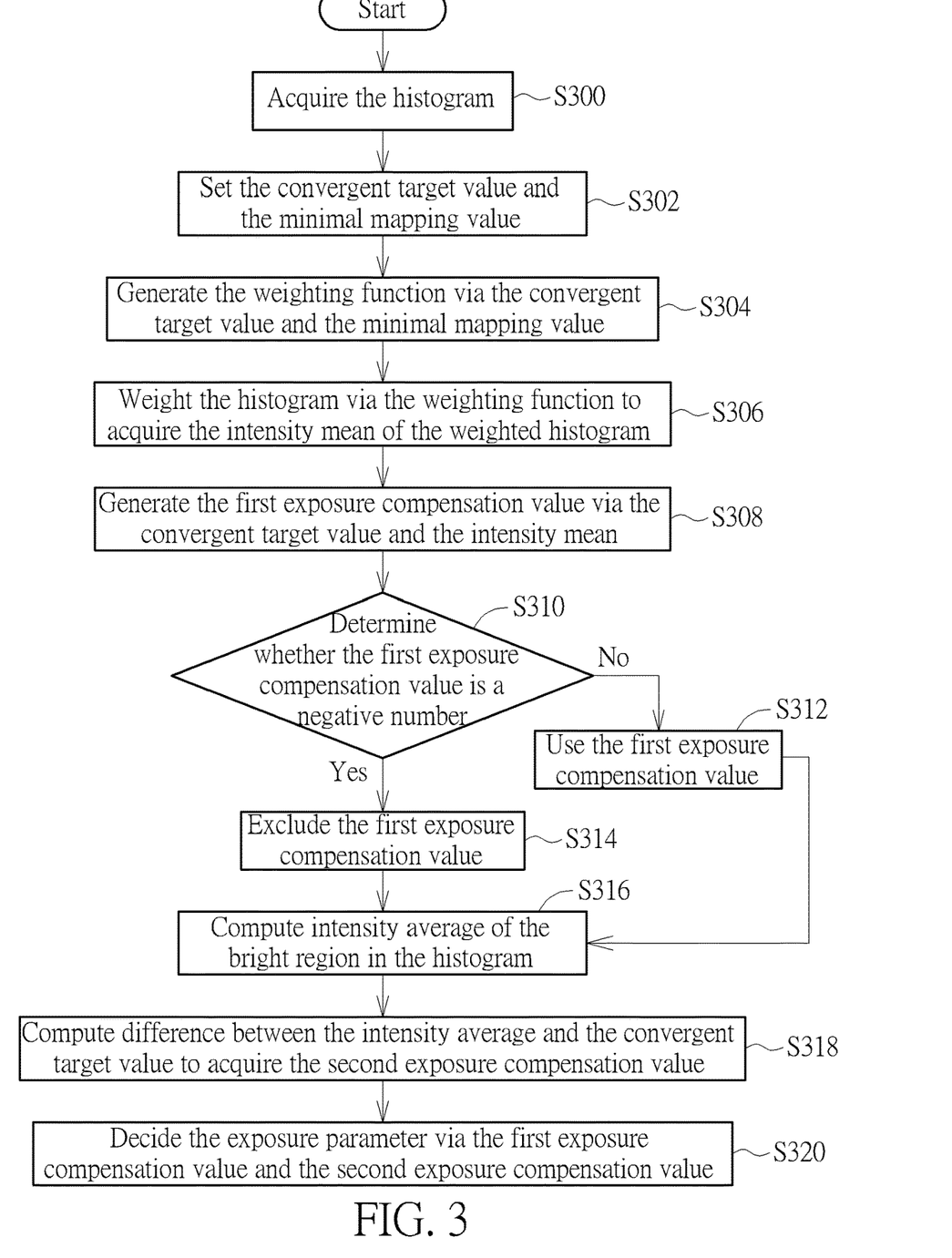
FIG. 3 is a flow chart of metering computation of the monitoring camera apparatus according to an embodiment of the present invention.

Please refer to FIG. 1 to FIG. 3. FIG. 1 is a functional block diagram of a monitoring camera apparatus 10 according to an embodiment of the present invention. FIG. 2 is a flow chart of exposure computation of the monitoring camera apparatus 10 according to an embodiment of the present invention. FIG. 3 is a flow chart of metering computation of the monitoring camera apparatus 10 according to an embodiment of the present invention. The monitoring camera apparatus 10 can include an image receiver 12 and an operation processor 14 electrically connected to each other. The image receiver 12 can receive an image relevant to a monitoring area of the monitoring camera apparatus 10. For example, the image receiver 12 can be a camera or a charge-coupled device, which is used to directly capture the image. As the monitoring camera apparatus 10 is applied to a low dynamic place or a high dynamic place, the operation processor 14 can execute a metering compensation method of the present invention to effectively increase visibility of the image received by the image receiver 12 for generating the high quality image.

The operation processor 14 can execute the exposure computation process and the metering computation process when the image receiver 12 receives the image. In the exposure computation process, steps S200 and S202 are executed that the operation processor 14 can receive the image from the image receiver 12, and optionally process multiple exposure composition steps, such as high dynamic range imaging procedure (HDRI) or dynamic range compression procedure (DRC). Then, step S204 is executed to process the metering computation process of the present invention for acquiring an applicable exposure compensation value. Step S206 is executed to analyze the exposure compensation value acquired in step S204, and determine whether an exposure parameter of the monitoring camera apparatus 10 is in need of adjustment according to the exposure compensation value. If no, step S208 is executed to process normal monitoring and recording procedure. If yes, step S210 is executed to drive an exposure adjustment module of the monitoring camera apparatus 10 to adjust the exposure parameter, such as adjustment about at least one of a diaphragm, an exposure period and a gain of the monitoring camera apparatus 10; after that, step S200 can be executed to confirm whether the exposure parameter of the monitoring camera apparatus 10 is in a preferred state.

In step S202, the image receiver 12 can receive histograms corresponding to a plurality of images and process the exposure adjustment for the multiple exposure composition steps. The plurality of images is received at different points of time during a short period so that time differences exist between the images; if the object (such as the person or the vehicle) inside the monitoring area is in a continuously moving state, position of the object within different images may be changed, and motion detecting and estimating technology can be optionally processed to compensate deviation about a movement of the object for avoiding afterimage in image composition. When the movement's deviation of the object is compensated by the motion detecting and estimating technology, the plurality of images (which is processed by the exposure adjustment) can be composited via the HDRI or DRC procedure to generate a dynamic range compression (DRC) curve relevant to the composition image.

Figure 4:
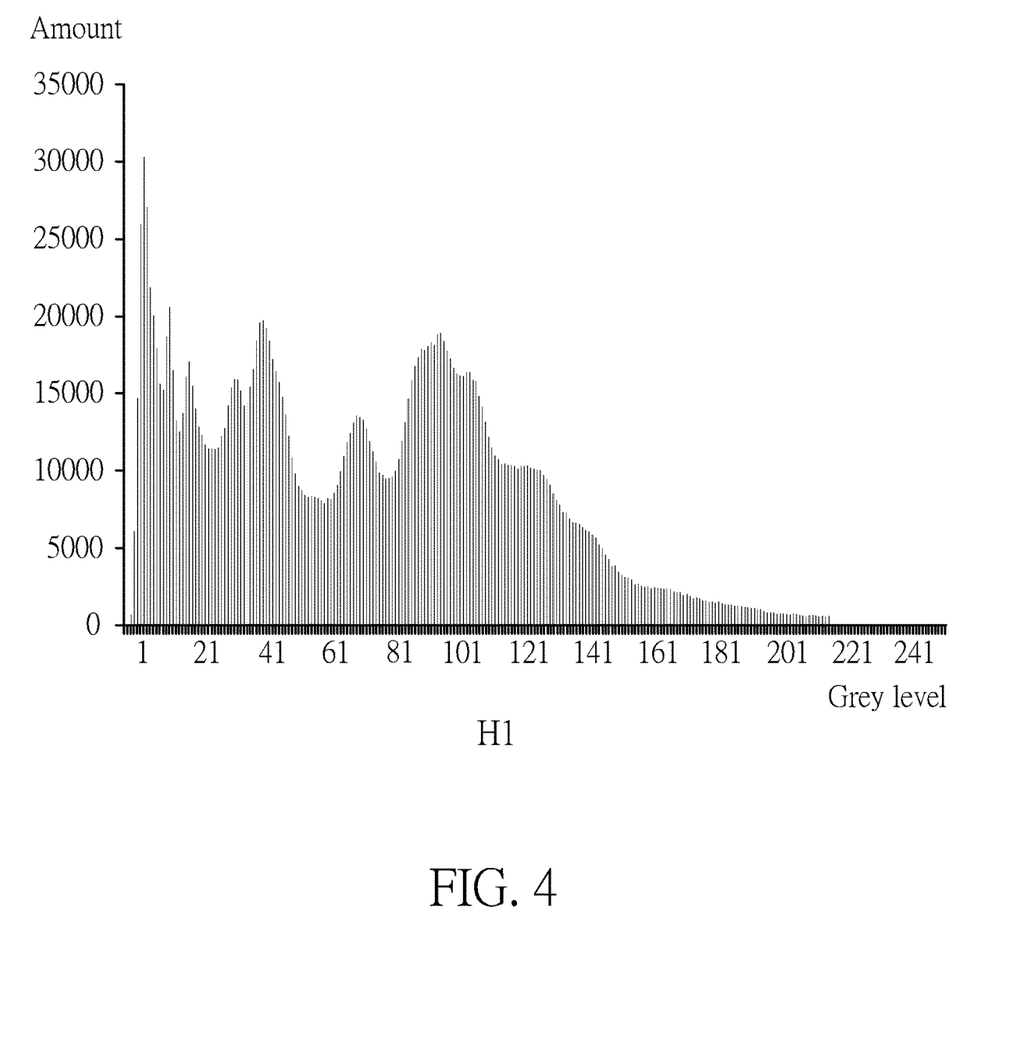
FIG. 4 is a diagram of a histogram according to the embodiment of the present invention.
Figure 5:
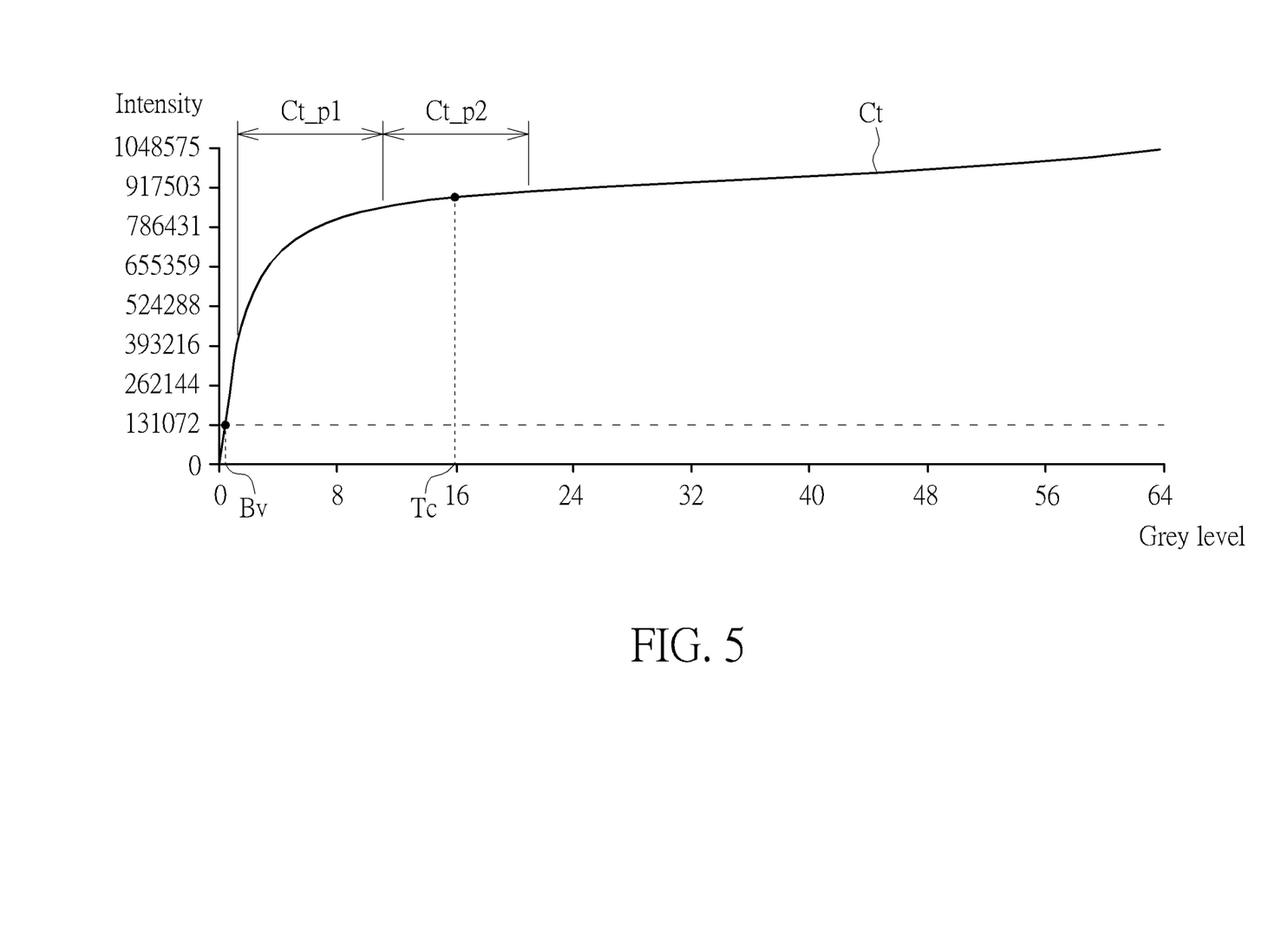
FIG. 5 is a diagram of a transformation curve according to the embodiment of the present invention.
Figure 6:
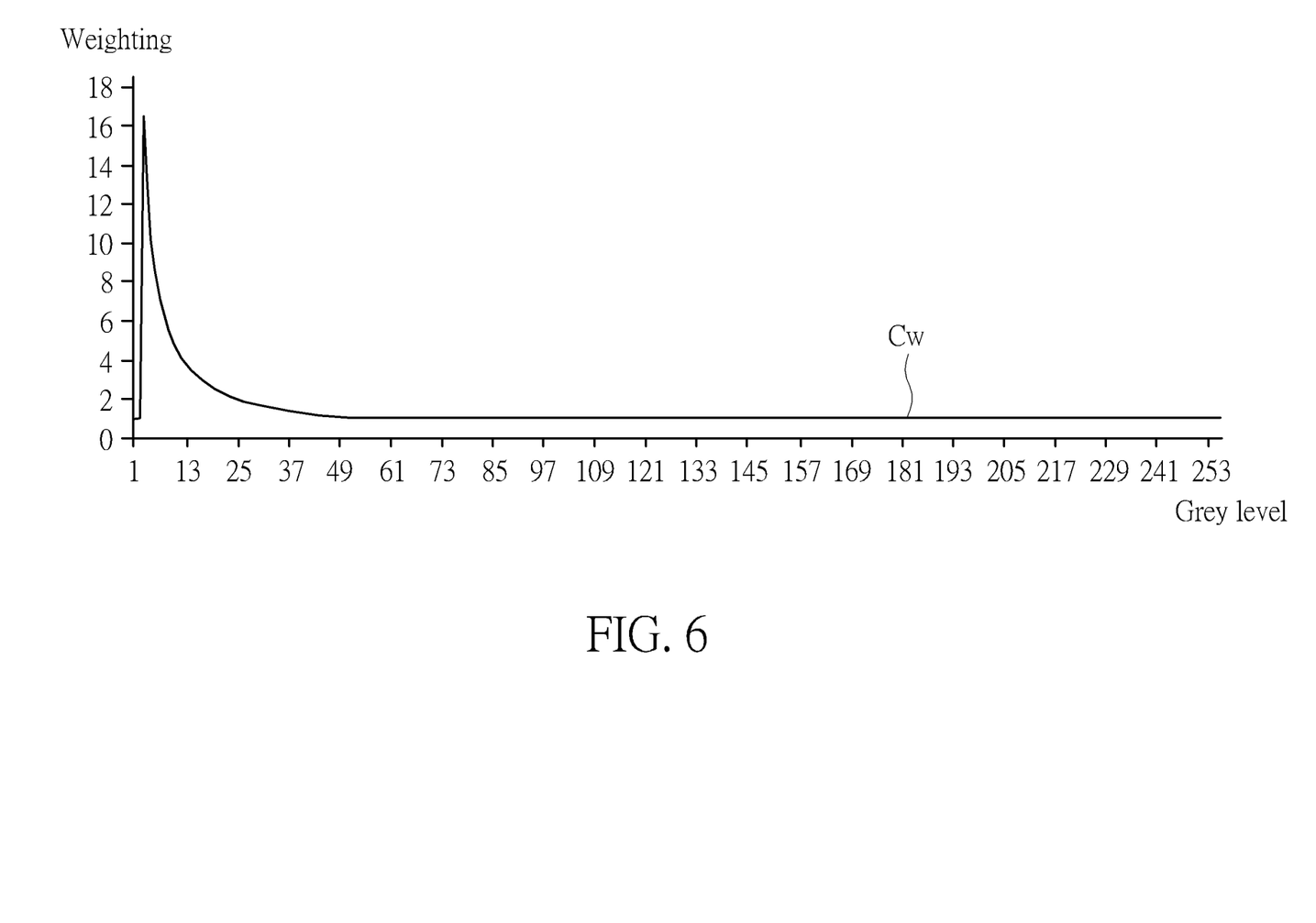
FIG. 6 is a diagram of a weighting function according to the embodiment of the present invention.
Figure 7:
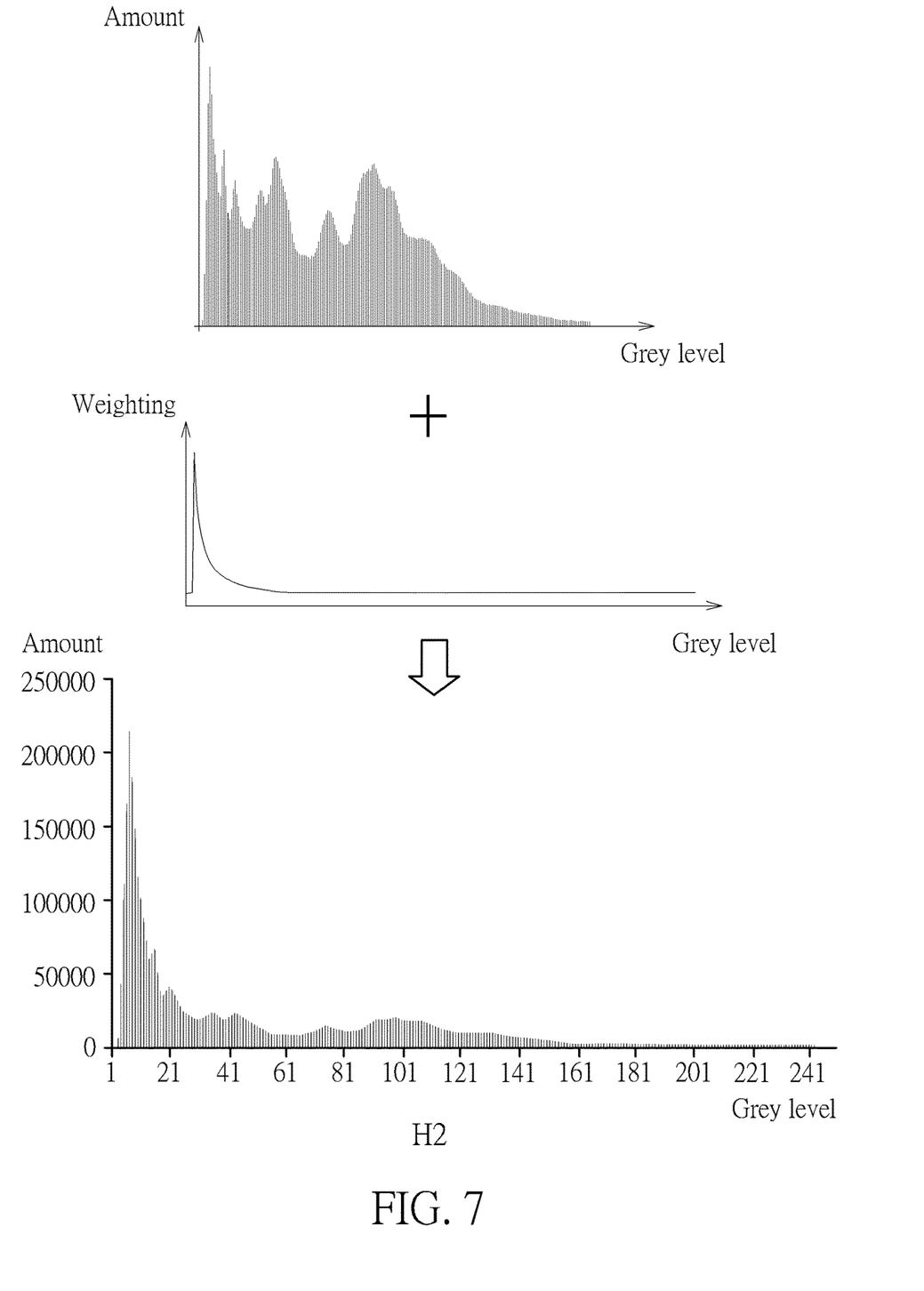
FIG. 7 is a diagram of the histogram transformed into a weighted histogram through a weighted distribution metering function according to the embodiment of the present invention.
Figure 8:
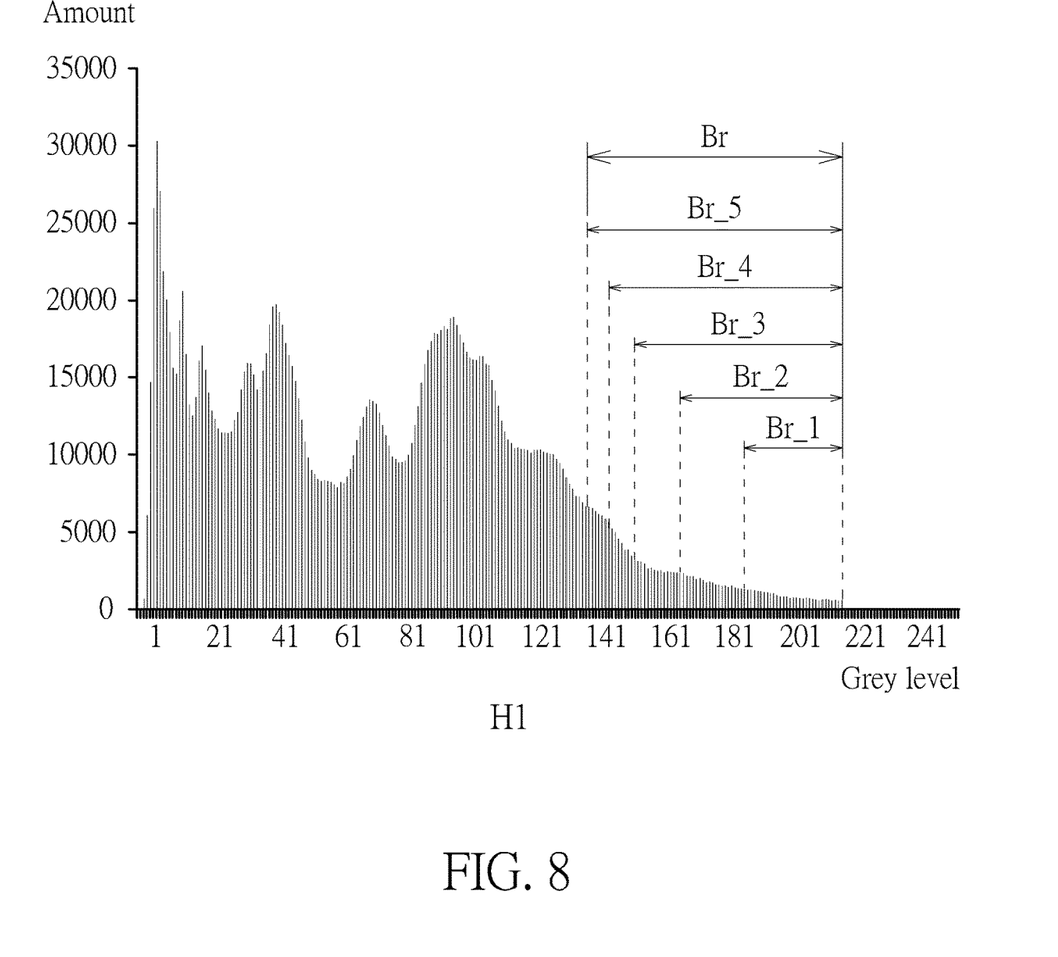
FIG. 8 is a diagram of executing a high-intensity compensation metering function via the histogram according to the embodiment of the present invention.

Step S204 is related to the metering compensation method of the present invention for increasing visibility of the image. Please refer to FIG. 3 to FIG. 8. FIG. 4 is a diagram of a histogram H1 according to the embodiment of the present invention. FIG. 5 is a diagram of a transformation curve Ct according to the embodiment of the present invention. FIG. 6 is a diagram of a weighting function Cw according to the embodiment of the present invention. FIG. 7 is a diagram of the histogram H1 transformed into a weighted histogram H2 through a weighted distribution metering function according to the embodiment of the present invention. FIG. 8 is a diagram of executing a high-intensity compensation metering function via the histogram H1 according to the embodiment of the present invention. In the metering computation process, steps S300 and S302 are executed to acquire the histogram H1 of the image, and set a convergent target value Tc and a minimal mapping value Bv according to an actual demand. As shown in FIG. 4, the histogram H1 represents distributed accumulation of pixel's values inside the image. The convergent target value Tc and the minimal mapping value Bv can be set by the transformation curve Ct generated from the image, such as setting by the DRC curve or a local tone mapping (LTM) curve.

As an example of the DRC curve shown in FIG. 5, step S302 is executed to analyze whether a slope of a specific section within the transformation curve Ct is smaller than a predefined value, for finding out one or some sections of the transformation curve Ct which has the slope identical with or similar to a level state. An actual number of the predefined value depends on design demand, and a detailed description is omitted herein for simplicity. If the slope of one section Ct_p1 is greater than the predefined value, output intensity projected from pixels inside the section Ct_p1 can clearly represent details of the image; if the slope of another section Ct_p2 is smaller than the predefined value, output intensity projected from pixels inside the section Ct_p2 are similar to each other and difficult to identify the details, and the convergent target value Tc can be defined within the section Ct_p2. In addition, the minimal mapping value Bv can be defined according to a property of the transformation curve Ct for preventing the image's noise from being amplified; for example, if pixels of the transformation curve Ct smaller than specific threshold are determined to set at an original value, the specific threshold can be defined as the minimal mapping value Bv. In the histogram H1, some pixels smaller than the minimal mapping value Bv can be excluded without projection for decreasing influence of noise interference.

Then, step S304 is executed to generate the weighting function Cw via the convergent target value Tc and the minimal mapping value Bv. For example, the weighting function Cw may set a weighting value of one pixel equal to a gray level of the foresaid pixel when the gray level is smaller than the minimal mapping value Bv; the weighting function Cw may further set the weighting value of one pixel as a specific value when the gray level of the foresaid pixel is greater than the convergent target value Tc, and the specific value can be 1.0; the weighting function Cw may further set the weighting value of one pixel as a ratio of the convergent target value Tc to the gray level when the gray level of the foresaid pixel is between the convergent target value Tc and the minimal mapping value Bv, which means the convergent target value Tc is a dividend and the gray level of the pixel is a divisor and the foresaid ratio is a quotient. Variation in the grey level and the weighting value of the weighting function Cw can be represented as formula 3 and be a curve shown in FIG. 6; however, an actual application is not limited to the above-mentioned embodiment. Then, steps S306 and S308 are executed to weight the histogram H1 via the weighting function Cw so as to acquire intensity distribution of the weighted histogram H2, and utilize formula 1 to compute an intensity mean Im1 of the weighted histogram H2, and then utilize formula 2 to generate a first exposure compensation value Ec1 by the convergent target value Tc and the intensity mean Im1, as shown in FIG. 7. The first exposure compensation value Ec1 can be used in step S206 for determining whether the exposure parameter of the monitoring camera apparatus 10 is in need of adjustment. In the formula 1 of the present invention, a symbol i can be a natural number ranged between 0 and 255, which depends on fineness of the histogram.

$$Im1 = \sum_{i=0}^{255} Count_i \times (\text{Gray level}) \Big/ \sum_{i=0}^{255} Count_i \qquad \text{Formula 1}$$

$$Ec1 = \log_2(Tc/Im1) \qquad \text{Formula 2}$$

$$Cw = \begin{cases} \text{Gray level}, & \text{Gray level} < Bv \\ Tc/\text{Gray level}, & Bv \le \text{Gray level} \le Tc \\ 1, & \text{Gray level} > Tc \end{cases} \qquad \text{Formula 3}$$

Step S306 can acquire the intensity mean Im1 in several manners according to functional property of the monitoring camera apparatus 10. For example, if the exposure adjustment module of the monitoring camera apparatus 10 is automatically recovered to an initial setting (which means returning to zero) when being actuated, the metering compensation method of the present invention can restore an adjusting result of the exposure parameter in a previous phase to acquire an initial histogram before the exposure adjustment in the previous phase, and then utilize the weighting function Cw to weight the initial histogram for acquiring the intensity mean Im1 of the weighted histogram. Further, if the exposure adjustment module of the monitoring camera apparatus 10 can record the adjusting result of the exposure parameter in the previous phase, an amended histogram generated after the exposure adjustment in the previous phase can be directly used to be weighted via the weighting function Cw, so as to acquire the intensity mean Im1 of the weighted histogram. The intensity mean Im1 can be represented as a ratio of a product summation to a pixel's amount summation, such as the foresaid formula 1. The product summation means a sum of products of each grey level and a corresponding amount about all pixels in the histogram, and the pixel's amount summation means an amount of all pixels in the histogram.

Step S308 can generate the first exposure compensation value Ec1 by several computations. The metering compensation method of the present invention can compute an intensity ratio of the convergent target value Tc to the intensity mean Im1, so as to set the first exposure compensation value Ec1, such as the foresaid formula 2. For example, a base can be defined as 2, and a power can be defined as the intensity ratio of the convergent target value Tc to the intensity mean Im1, so that a logarithm can be computed as the first exposure compensation value Ec1. If the convergent target value Tc is set as 50 and the intensity mean Im1 is set as 25, the first exposure compensation value Ec1 can be computed as +1 EV, which means one time the illumination quantity is increased. If the convergent target value Tc is set as 25 and the intensity mean Im1 is set as 50, the first exposure compensation value Ec1 can be computed as −1 EV, which means one times the illumination quantity is decreased.

It should be mentioned that the metering compensation method of the present invention can optionally execute step S310 to determine whether the first exposure compensation value Ec1 is a negative number, for adjusting the exposure parameter of the exposure adjustment module of the monitoring camera apparatus 10 accordingly. As mentioned above, the first exposure compensation value Ec1 can be a positive number or the negative number. If the first exposure compensation value Ec1 is the positive number (such as +1 EV mentioned above), the current monitoring area may need more illumination for adjusting the image to a standard conforming to the convergent target value Tc, and the computed first exposure compensation value Ec1 can be used directly for execution of step S312. If the first exposure compensation value Ec1 is the negative number (such as −1 EV mentioned above), the current monitoring area may have sufficient illumination, so that the exposure adjustment module of the monitoring camera apparatus 10 is not adjusted, and step S314 is executed to exclude the computed first exposure compensation value Ec1. Then, steps S316 and S318 are executed to compute intensity average Im2 of a bright region Br of the histogram H1 via formula 4, and further compute a second exposure compensation value Ec2 via the formula 2, as shown in FIG. 8. Computation of the second exposure compensation value Ec2 is similar to the first exposure compensation value Ec1 computed by the formula 2. Final, step S320 is executed to decide the exposure parameter via a sum of the first exposure compensation value Ec1 and the second exposure compensation value Ec2. The decided exposure parameter can be provided for execution of step S206.

$$Im2 = \sum_{i=1}^{n} Wi \times Im\_i \Big/ \sum_{i=1}^{n} Wb \qquad \text{Formula 4}$$

For the process of acquiring the intensity average Im2 in step S316, a range of the bright region Br within the histogram H1 can be defined for a start, and then a plurality of sub-bright regions Br_i can be set inside the bright region Br of the histogram H1. Each sub-bright region Br_i can have a sub-intensity average Im_i. The sub-intensity averages Im_i of all the sub-bright regions Br_i can be respectively weighted by a plurality of predefined weighting parameters Wi. The weighted sub-intensity averages of all the sub-bright regions Br_i can be summed to compare with a sum of the plurality of predefined weighting parameters for generating the intensity average Im2, which means the foresaid formula 4. Each of the plurality of sub-bright regions Br_i can be set as being ranged from a highest grey level of the histogram H1 to an amount of pixels with a corresponding specific rate. As an example shown in FIG. 8, the metering compensation method of the present invention can define a sum of pixels with the specific rate (or can be interpreted as a specific dimensional rate) inside the histogram H1 as the bright region Br; the specific rate in the embodiment can be ten percent of the total pixel summation, and an actual rate can be varied according to the design demand. A group of five sub-bright regions Br_i (i=1~5) can be marked in the bright region Br. A pixel amount of the first sub-bright region Br_1 can be set as two percent of the total pixel summation. The pixel amount of the second sub-bright region Br_2 can be set as four percent of the total pixel summation. The pixel amount of the third sub-bright region Br_3 can be set as six percent of the total pixel summation. The pixel amount of the fourth sub-bright region Br_4 can be set as eight percent of the total pixel summation. The pixel amount of the fifth sub-bright region Br_5 can be set as ten percent of the total pixel summation.

Each sub-bright region Br_i may contain several pixels with different pixel values, and the sub-intensity averages of the sub-bright regions Br_i can be computed accordingly. The present invention can adjust the predefined weighting parameters Wi of the sub-bright regions Br_i in accordance with the metering demand. The predefined weighting parameter Wi of one sub-bright region Br_i can be the same as or different from the predefined weighting parameter Wi of another sub-bright region Br_i. For example, the predefined weighting parameter W1 of the first sub-bright region Br_1 can be increased to provide a preferred convergent effect in the brightest region of the histogram H1, so the image is not over-exposed and keeps details. Final, the weighted sub-intensity averages of the all sub-bright regions Br_i are summed up to be a dividend, and the predefined weighting parameters Wi are summed up to be a divisor, and a quotient can be computed accordingly to be the intensity average Im2. In the present invention, an amount of the sub-bright region and a ratio of the pixel amount of each sub-bright region to the total pixel amount (such as a percent of the amount or dimensions) are not limited to the above-mentioned embodiments, and depend on the design demand.

When the first exposure compensation value Ec1 is computed via the weighted distribution metering function and the second exposure compensation value Ec2 is computed via the high-intensity compensation metering function, the first exposure compensation value Ec1 and the second exposure compensation value Ec2 can be applied for adjusting the exposure parameter of the exposure adjustment module of the monitoring camera apparatus 10, as described in step S206. If the first exposure compensation value Ec1 is the positive number, the bright region and the dark region in the image are in need of adjustment, so that the exposure parameter of the monitoring camera apparatus 10 can be a summation of the first exposure compensation value Ec1 and the second exposure compensation value Ec2. If the first exposure compensation value Ec1 is the negative number, the metering compensation method of the present invention may decide the image does not have the over-dark region, so that the first exposure compensation value Ec1 can be abandoned, and the exposure parameter of the monitoring camera apparatus 10 is set as the second exposure compensation value Ec2.

In conclusion, the metering compensation method of the present invention not only can analyze the bright region and the dark region in the image to decide the first exposure compensation value and the second exposure compensation value, but also can determine whether the first exposure compensation value is applied for avoiding improper convergence resulted from some particular situation because the first exposure compensation value may be only used to consider the over-dark condition. The first exposure compensation value being the negative number may represent the image does not have the over-dark region; if the exposure parameter is computed by the first exposure compensation value, an over-exposure scene is increased and may be larger than a non-exposure scene in the image. Thus, the present invention can abandon the negative first exposure compensation value directly for the preferred visibility of the image in any kind of situations.

The present invention provides the metering compensation method containing the weighted distribution metering function and the high-intensity compensation metering function. The weighted distribution metering function can generate the weighting function in accordance with the convergent target value and the minimal mapping value, and acquire the intensity mean of the histogram transformed by the weighting function, and compute the first exposure compensation value via the intensity ratio of the convergent target value to the intensity mean, so as to effectively preserve the image details according to distribution in the histogram. The high-intensity compensation metering function can set the plurality of sub-bright regions inside the bright region of the histogram; each the sub-bright region can be weighted by specific weighting parameter to compute the intensity average, and a difference between the intensity average and the convergent target value can represent an amendable range of the bright region for acquiring the second exposure compensation value. The monitoring camera apparatus of the present invention can adjust the exposure parameter of the adjustment module in accordance with the sum of the first exposure compensation value and the second exposure compensation value. The present invention can prevent the image from over-exposure and preserve details of the dark region for acquiring the monitoring image with the preferred visibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A metering compensation method applied to a monitoring camera apparatus of increasing visibility of an image, the metering compensation method comprising:
acquiring a histogram of the image generated by the monitoring camera apparatus;
analyzing whether a slope of a specific section within a dynamic range compression curve is smaller than a predefined value;
defining a convergent target value within a range of the specific section when the slope is smaller than the predefined value;
setting pixels of the dynamic range compression curve smaller than a specific threshold at an original value and defining the specific threshold as a minimal mapping value;
utilizing the convergent target value and the minimal mapping value to set a weighting function;
transforming the histogram into a weighted histogram via the weighting function to acquire an intensity mean of the weighted histogram; and
utilizing the convergent target value and the intensity mean to generate a first exposure compensation value, wherein adjustment of an exposure parameter of the monitoring camera apparatus is determined by the first exposure compensation value.

2. The metering compensation method of claim 1, further comprising:

determining whether the first exposure compensation value is a negative number to adjust the exposure parameter of the monitoring camera apparatus accordingly.

3. The metering compensation method of claim 1, wherein one pixel of the weighting function has a weighting value equal to a gray level of the pixel when the gray level is smaller than the minimal mapping value, the pixel of the weighting function sets the weighting value as 1.0 when the gray level is greater than the convergent target value, and the pixel of the weighting function has the weighting value as a ratio of the convergent target value to the gray level when the gray level is between the minimal mapping value and the convergent target value.

4. The metering compensation method of claim 1, wherein transforming the histogram into the weighted histogram via the weighting function to acquire the intensity mean of the weighted histogram comprises:
restoring an adjusting result of the exposure parameter in a previous phase;
acquiring an initial histogram before exposure adjustment in the previous phase; and
utilizing the weighting function to weight the initial histogram to acquire the related intensity mean.

5. The metering compensation method of claim 1, wherein transforming the histogram into the weighted histogram via the weighting function to acquire the intensity mean of the weighted histogram comprises:
preserving an adjusting result of the exposure parameter in a previous phase;
acquiring an amended histogram after exposure adjustment in the previous phase; and
utilizing the weighting function to weight the amended histogram to acquire the related intensity mean.

6. The metering compensation method of claim 1, wherein an intensity ratio of the convergent target value to the intensity mean is computed to set the first exposure compensation value.

7. The metering compensation method of claim 1, further comprising:
acquiring an intensity average of a bright region of the histogram; and
computing a difference between the intensity average and the convergent target value to acquire a second exposure compensation value, wherein adjustment of the exposure parameter of the monitoring camera apparatus is determined by cooperation of the first exposure compensation value and the second exposure compensation value.

8. The metering compensation method of claim 7, further comprising:
setting a plurality of sub-bright regions inside the bright region;
computing a sub-intensity average of each sub-bright region;
utilizing a plurality of predefined weighting parameters to respectively weight sub-intensity averages of the plurality of sub-bright regions; and
summing up the weighted sub-intensity averages of the plurality of sub-bright regions to compare with a sum of the plurality of predefined weighting parameters for generating the intensity average.

9. The metering compensation method of claim 8, wherein dimensions of the plurality of sub-bright regions are different from each other, and the plurality of predefined weighting parameters are different from each other or similar to each other in accordance with intensity metering demand.

10. The metering compensation method of claim 1, wherein the metering compensation method acquires histograms of a plurality of images generated at different points of time for executing exposure adjustment, and stitches the plurality of images processed by the exposure adjustment via high dynamic range imaging technology.

11. A monitoring camera apparatus of increasing visibility of an image, comprising:
an image receiver adapted to generate the image; and
an operation processor electrically connected to the image receiver, the operation processor being adapted to acquire a histogram of the image generated by the monitoring camera apparatus, analyze whether a slope of a specific section within a dynamic range compression curve is smaller than a predefined value, define a convergent target value within a range of the specific section when the slope is smaller than the predefined value, set pixels of the dynamic range compression curve smaller than a specific threshold at an original value and defining the specific threshold as a minimal mapping value, utilize the convergent target value and the minimal mapping value to set a weighting function, transform the histogram into a weighted histogram via the weighting function to acquire an intensity mean of the weighted histogram, and utilize the convergent target value and the intensity mean to generate a first exposure compensation value for acquiring the high quality image in a low dynamic place or in a high dynamic place;
wherein adjustment of an exposure parameter of the monitoring camera apparatus is determined by the first exposure compensation value.

12. The monitoring camera apparatus of claim 11, wherein the operation processor is further adapted to determine whether the first exposure compensation value is a negative number to adjust the exposure parameter of the monitoring camera apparatus accordingly.

13. The monitoring camera apparatus of claim 11, wherein one pixel of the weighting function has a weighting value equal to a gray level of the pixel when the gray level is smaller than the minimal mapping value, the pixel of the weighting function sets the weighting value as 1.0 when the gray level is greater than the convergent target value, and the pixel of the weighting function has the weighting value as a ratio of the convergent target value to the gray level when the gray level is between the minimal mapping value and the convergent target value.

14. The monitoring camera apparatus of claim 11, wherein the operation processor is further adapted to restore an adjusting result of the exposure parameter in a previous phase, acquire an initial histogram before exposure adjustment in the previous phase, and utilize the weighting function to weight the initial histogram to acquire the related intensity mean.

15. The monitoring camera apparatus of claim 11, wherein the operation processor is further adapted to preserve an adjusting result of the exposure parameter in a previous phase, acquire an amended histogram after exposure adjustment in the previous phase, and utilize the weighting function to weight the amended histogram to acquire the related intensity mean.

16. The monitoring camera apparatus of claim 11, wherein an intensity ratio of the convergent target value to the intensity mean is computed to set the first exposure compensation value.

17. The monitoring camera apparatus of claim 11, wherein the operation processor is further adapted to acquiring a bright region of the histogram, set a plurality of sub-bright regions inside the bright region, compute a sub-intensity average of each sub-bright region, utilize a plurality of predefined weighting parameters to respectively weight sub-intensity averages of the plurality of sub-bright regions, sum up the weighted sub-intensity averages of the plurality of sub-bright regions to compare with a sum of the plurality of predefined weighting parameters for generating an intensity average, and computing a difference between the intensity average and the convergent target value to acquire a second exposure compensation value, wherein adjustment of the exposure parameter of the monitoring camera apparatus is determined by cooperation of the first exposure compensation value and the second exposure compensation value, wherein dimensions of the plurality of sub-bright regions are different from each other and the plurality of predefined weighting parameters are different from each other or similar to each other in accordance with intensity metering demand.

18. The monitoring camera apparatus of claim 11, wherein the metering compensation method acquires histograms of a plurality of images generated at different points of time for executing exposure adjustment, and stitches the plurality of images processed by the exposure adjustment via high dynamic range imaging technology.

\* \* \* \* \*